(12) United States Patent
Smith

(10) Patent No.: US 6,842,191 B1
(45) Date of Patent: Jan. 11, 2005

(54) COLOR IMAGE RESTORATION WITH ANTI-ALIAS

(75) Inventor: Stewart Gresty Smith, Edinburgh (GB)

(73) Assignee: STMicroelectronics Limited, Marlow (GB)

( * ) Notice: Subject to any disclaimer, the term of this patent is extended or adjusted under 35 U.S.C. 154(b) by 858 days.

(21) Appl. No.: 09/705,145

(22) Filed: Nov. 2, 2000

(30) Foreign Application Priority Data

Nov. 3, 1999 (GB) .............................................. 9925902

(51) Int. Cl.⁷ ................................................ H04N 3/14
(52) U.S. Cl. .................... 348/273; 348/222.1; 348/280; 358/518; 382/167
(58) Field of Search ................................ 348/272, 273, 348/279, 280, 281, 282, 254; 382/162, 167, 300, 275, 254, 263; 358/518, 525

(56) References Cited

U.S. PATENT DOCUMENTS

| | | | |
|---|---|---|---|
| 3,971,065 A | 7/1976 | Bayer | 358/41 |
| 4,176,373 A | 11/1979 | Dillon et al. | 358/37 |
| 4,630,307 A | 12/1986 | Cok | 382/25 |
| 4,642,678 A * | 2/1987 | Cok | 348/242 |
| 5,363,209 A * | 11/1994 | Eschbach et al. | 358/445 |
| 5,373,322 A | 12/1994 | Laroche et al. | 348/273 |
| 5,382,976 A * | 1/1995 | Hibbard | 348/273 |
| 5,652,621 A * | 7/1997 | Adams et al. | 348/272 |
| 5,805,217 A | 9/1998 | Lu et al. | 348/273 |
| 6,272,261 B1 * | 8/2001 | Matsuoka | 382/276 |
| 6,404,918 B1 * | 6/2002 | Hel-or et al. | 382/167 |
| 6,476,865 B1 * | 11/2002 | Gindele et al. | 348/277 |
| 6,493,029 B1 * | 12/2002 | Denyer et al. | 348/236 |

FOREIGN PATENT DOCUMENTS

WO 9735438 9/1997 ............ H04N/9/04

\* cited by examiner

*Primary Examiner*—Ngoc-Yen Vu
*Assistant Examiner*—Chriss S. Yoder
(74) *Attorney, Agent, or Firm*—Lisa K. Jorgenson; Allen, Dyer, Doppelt, Milbrath & Gilchrist, P.A.

(57) ABSTRACT

A video signal is produced from a color imaging array of the type having luminance elements of a first color (typically green) and chrominance elements of second and third colors (typically red and blue). The video signal processing includes, for each element of the second color, estimating a chrominance value of the third color as a function of the actual chrominance value of that element, the local neighborhood of actual chrominance values of the third color, and an anti-aliasing control value derived from the local neighborhood of actual luminance values and actual third color chrominance values. In preferred forms, a similar estimation of the second color at each third color element is performed.

30 Claims, 3 Drawing Sheets

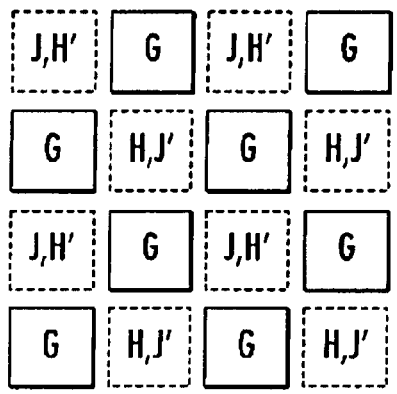
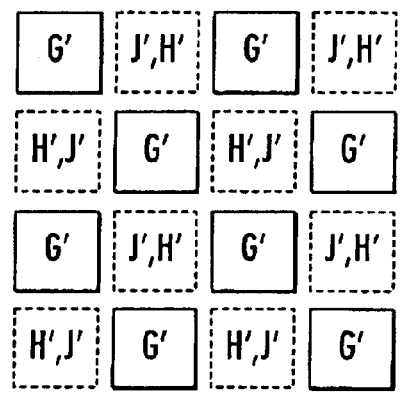
FIG. 4a
FIG. 4b
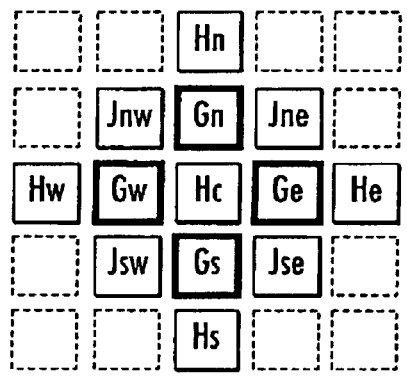
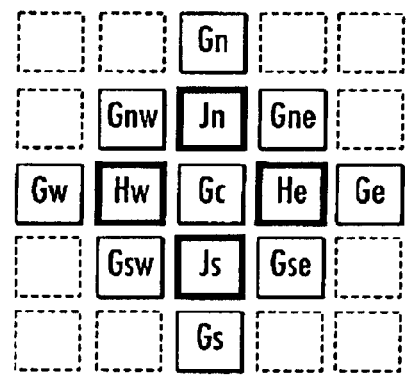
FIG. 5a
FIG. 5b
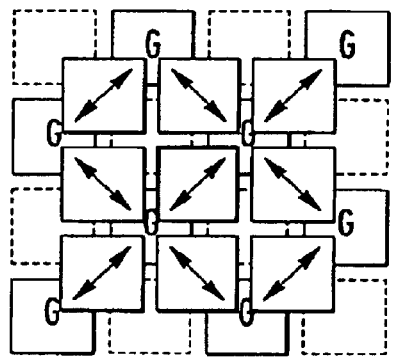
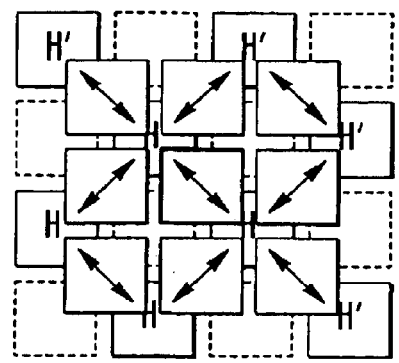
FIG. 6a
FIG. 6b

COLOR IMAGE RESTORATION WITH ANTI-ALIAS

FIELD OF THE INVENTION

The present invention relates to signal processing methods for use in color imaging systems. More particularly, the invention relates to interpolation and filtering methods with anti-aliasing for color image restoration.

BACKGROUND OF THE INVENTION

Market growth for consumer electronic imaging products, such as digital-cameras, for example, is increasingly driving the development of low-cost color video cameras. A major cost of these cameras is the image sensor chip, whose cost is independent of the sensor area. Two major goals of sensor designers are to improve sensitivity by increasing pixel area, and improve resolution by increasing pixel count. However both of these goals increase sensor area, and hence, sensor cost. If sensor area is to remain constant, then conventional approaches to these goals are mutually exclusive. Image resolution can only be increased at the cost of lowered sensitivity, and sensitivity can only be increased at the cost of lowered resolution.

All color cameras spectrally filter the received image, which is typically within three bands of the visible spectrum. These bands correspond to the primary colors red, green, and blue. Sometimes these bands correspond to the complementary colors cyan, magenta, and yellow. Further color sets are also possible.

There are two principal forms of color camera construction. In the first form the image is split or replicated to form multiple images, either concurrently on multiple sensors or sequentially on a single sensor. Each of these multiple images, or color channels, is separately filtered to produce one spectral component of the defined composite color image. Each of the multiple images represents an optimal spatially-sampled version of the original scene.

In the second form, a single image is formed on a single sensor device. This device is spatially divided into many (typically 100,000 or more) pixels and covered with a color filter array (CFA) comprising a mixture of individual color filters. Each color filter corresponds to one of the desired spectral components, and is arranged in such a manner as to provide concurrent but sub-sampled color channels. Subsequently, interpolation techniques must be employed to restore the missing data in each color channel.

While the split-image form gives superior results at the expense of increased camera cost and size, most consumer cameras use the single-sensor CFA form. The sensor in these cases may typically be a charge coupled device (CCD) or CMOS array sensor. The production process for both types of sensors is well disposed to deposition of the color filters when the products are in silicon-wafer form. This enhances the cost benefit.

Many different CFA patterns are in use, including vertical stripes of single colors as well as fully 2-dimensional CFA patterns. FIG. 1 illustrates three example patterns. FIG. 1(a) is a vertical stripe (RGB) pattern. FIG. 1(b) is a matrix of complementary colors which is in common use. FIG. 1(c) is an RGB CFA pattern disclosed in U.S. Pat. No. 3,971,065. The pattern of FIG. 1(c) contains more green pixels than red or blue because green is the principal primary color component of luminance. As disclosed in U.S. Pat. No. 4,176,373, this pattern may be used with restoration techniques to produce an RGB triplet on every pixel site. This increases effective pixel size and hence sensitivity by a factor of three at no cost in sensor area.

Once the pattern is decided, it is necessary to develop techniques and circuits for combining the results of individual pixels into a composite color image representation. The choice of a color filter pattern and of the subsequent restoration process together determine the overall performance of the color camera. In this context, performance refers to both perceived resolution and color quality.

SUMMARY OF THE INVENTION

The subject of the present invention is a signal processing technique for producing a composite color image from patterns such as that of FIG. 1(c), while retaining the inherent sensitivity advantage.

An immediate consequence of the sub-sampling inherent in the single sensor CFA approach is the presence of aliasing artifacts in the color channel sources. While aliasing may be minimized by band limiting the source prior to imaging (i.e., optically), this has a detrimental blurring effect on overall image quality. Linear signal processing techniques are inadequate for the estimation of missing color channel data. Such estimation requires the synthesis of frequencies absent in the source data. A further subject of the present invention is a signal processing technique to minimize the energy of aliased components from individual color channels present in the final image.

An object of the present invention is to produce a full color (e.g., RGB) image from individual pixel data which themselves represent only single colors. Another object is to produce this full color data for each pixel location.

The respective U.S. Pat. Nos. 4,176,373, 4,630,307 and 5,373,322 disclose alternative processes of this general type. The present invention provides a superior technique, with anti-aliasing steps contained in the interpolation methods.

The present invention provides a method of processing a video signal from a color imaging array of the type comprising a plurality of luminance elements of a first color, a first plurality of chrominance elements of a second color, and a second plurality of chrominance elements of a third color. The method comprises estimating, for each of the chrominance elements of one of the second and third colors, having a first chrominance value, a second chrominance value for the other of the second and third colors.

The estimated second chrominance values for each individual target element is computed as a function of the actual chrominance value of the target element, the local neighborhood of actual chrominance values of the same color to the estimated second chrominance value, and an anti-aliasing control value derived from the local neighborhood of actual luminance and chrominance values of colors different to that of the target element.

The invention provides a color imaging system which includes an image sensor device including a color imaging array of the type comprising a plurality of luminance elements of a first color, a first plurality of chrominance elements of a second color, and a second plurality of chrominance elements of a third color. The system further comprises a signal processor which includes an interpolator circuit connected to receive a video signal output from the image sensor device. The interpolator circuit operates to estimate, for each of the chrominance elements of the second color a second chrominance value for the third color. The estimated chrominance values for each individual target element are computed as a function of the actual chrominance value of the target element, the local neighborhood of actual chrominance values of the third color to the estimated chrominance value, and an anti-aliasing control value derived from the local neighborhood of actual luminance and chrominance values of colors different to that of the target element.

Other features of the present invention will be apparent from the claims appended hereto and from the following description of preferred embodiments.

BRIEF DESCRIPTION OF THE DRAWINGS

FIG. 4(a) is a diagram similar to FIG. 3 illustrating the output from a first stage of the signal processing method illustrated in FIG. 2;

FIG. 4(b) is a diagram similar to FIG. 3 illustrating the output from a second stage of the signal processing method illustrated in FIG. 2;

FIG. 5(a) illustrates the pixel neighborhood around an estimation site used for calculating estimated values in a first stage of the signal processing method illustrated in FIG. 2;

FIG. 5(b) illustrates the pixel neighborhood around an estimation site used for calculating estimated values in a second stage of the signal processing method illustrated in FIG. 2;

FIGS. 6(a) and 6(b) illustrate a filtering step which may be used in either of the first and second stages of the signal processing method illustrated in FIG. 2;

DETAILED DESCRIPTION OF THE PREFERRED EMBODIMENTS

Figure 1A:
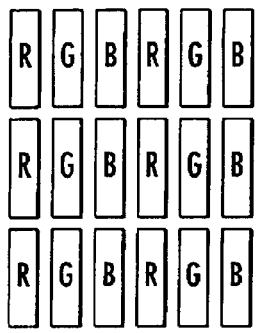
FIGS. 1(a), 1(b) and 1(c) illustrate CFA patterns according to the prior art, with the pattern of FIG. 1(c) being of particular relevance to the present invention.
Figure 1B:
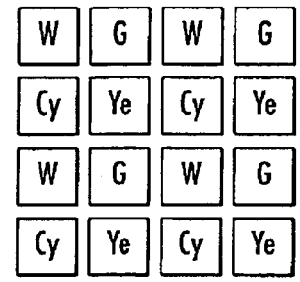
Figure 1C:
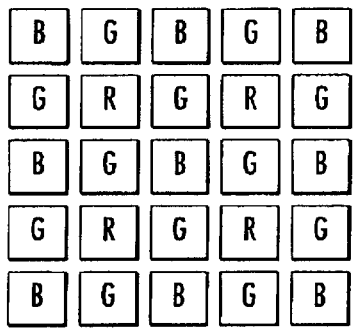

Referring now to the drawings, the present invention is applicable to CFA image sensors having a CFA pattern of the type illustrated in FIG. 1(c). As described in U.S. Pat. No. 3,971,065, a color imaging array of this type includes a set of luminance-sensitive elements, a set of first chrominance-sensitive elements, and a set of second chrominance-sensitive elements arranged in the array in a repeating pattern with luminance elements dominating the array.

Embodiments of the invention will be described herein in relation to an RGB array. Green pixels are the luminance elements, and red and blue pixels are the first and second chrominance elements. It will be understood that the invention may also be implemented using other color sets, as will be apparent to those skilled in the art.

The embodiments described also use arrays in which alternate pixel sites comprise luminance (green) pixels, and the remaining pixel sites comprise the first and second chrominance (red and blue) pixels, arranged in alternate rows. That is, the green pixels are arranged in a checkerboard pattern with alternate rows of red and blue pixels respectively filling the remaining sites. It will further be understood that this pattern may be varied while still providing an array of the same general type.

Figure 2:
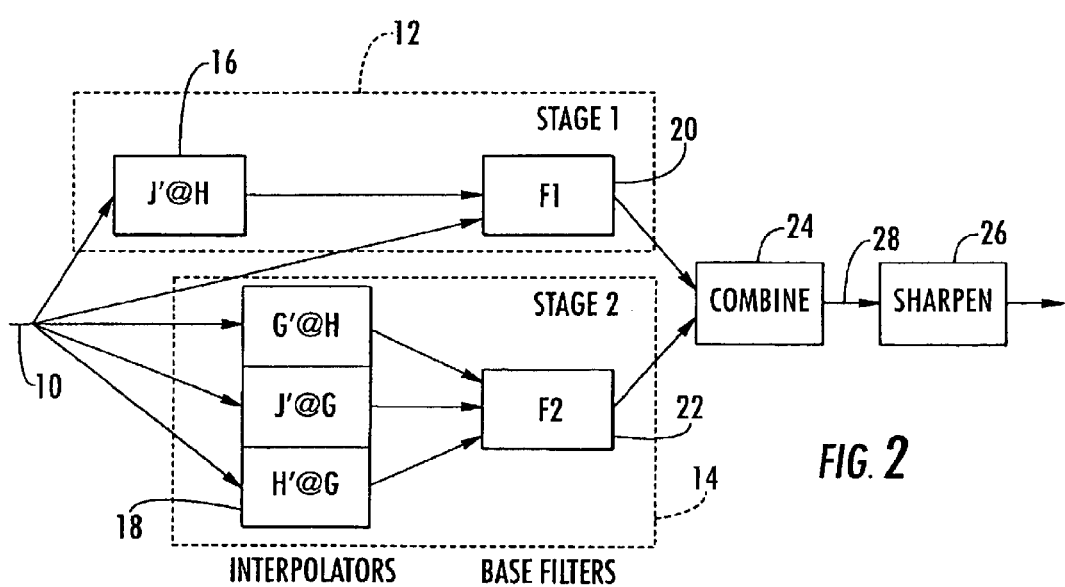
FIG. 2 is a block diagram illustrating one exemplary embodiment of a signal processing method in accordance with the present invention.

FIG. 2 illustrates a block diagram illustrating one exemplary embodiment of a signal processing method in accordance with the present invention. A video data stream 10 is input to a first processing stage 12 and a second processing stage 14. Each of the stages 1 and 2 includes a first interpolation step 16, 18 and a second filtering step 20, 22. The invention supports a number of possible combinations of these first and second stage interpolation and filtering steps. The outputs from the first and second stages are combined 24 as required depending on which interpolation and filtering steps have been applied. Optionally, edge-enhancement (sharpening) 26 may be applied to the output signal 28.

The overall process involves estimating the missing data in the color channels from the array of FIG. 1(c). This is accomplished by various combinations of the interpolation and filtering steps 16, 18, 20 and 22. In this example, techniques for recovering blue and red data are dependent on row index. Odd-indexed rows contain the blue pixels and even-indexed rows contain the red pixels in this particular embodiment. The chrominance (red or blue) samples present in even-indexed rows are denoted as H, and the chrominance (red or blue) samples in odd-indexed rows are denoted as J. Luminance (green) samples are denoted as G. The prime symbol, e.g., H', is used to denote an estimated data value.

When using this notation in relation to actual and estimated sample values at a chrominance pixel, H denotes the color (red or blue in this example) of the particular chrominance pixel (the target element or estimation site) for which a corresponding estimated value J' is to be calculated. The variable J denotes the other chrominance color, which is blue if H is red and red if H is blue. Where two chrominance values H' and J' are to be estimated for a luminance pixel G, H and J arbitrarily denote the two chrominance colors.

Figure 3:
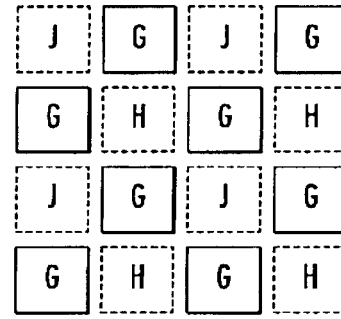
FIG. 3 is a diagram illustrating a portion of an example of an image sensor array representing the input data for the signal processing method illustrated in FIG. 2.

FIG. 3 shows a 4×4 segment from FIG. 1(c) using this H and J notation. This is the effective starting point for the reconstruction method, and describes the data present in the data stream at the input of FIG. 2.

FIG. 4(a) shows the output of the first stage interpolation 16, where estimated H' and J' samples are generated for J and H sites respectively. The first stage interpolation 16 provides checkerboard sampling on all three color channels. The H and J channels comprise a mixture of actual and estimated sample values. The step 16 provides estimated values J' and H' for each H and J site respectively, with anti-aliasing. This step in itself can result in an image of acceptable quality for many applications.

A detailed example of the first stage interpolation step 16 will now be described. The operations described are symmetrical in an orthogonal sense. That is, transformations such as mirroring or rotation through multiples of 90 degrees do not change their result. Moreover, the relationship between H and J samples are symmetrical. With no loss of generality, compass direction N (north) is associated with the top of the image. Methods by which a J sample J'(h) may be estimated at an H site will now be described.

FIG. 5(a) shows a 5×5 pixel neighborhood centered on H sample Hc at the estimation site. Edge-touching G samples exist to the N, E, S and W directions, corner-touching J samples exist to the NW, NE, SE and SW directions, and remote H samples exist to the N, E, S and W directions. The value J' may be estimated for the site Hc as follows:

Local averages Ha(h), Ga(h) and Ja(h) are derived by appropriate center-weighted filtering functions. For example:

$$Ha(h)=0.5\ Hc+0.125(Hn+He+Hs+Hw)$$

$$Ja(h)=0.25(Jnw+Jne+Jse+Jsw)$$

$$Ga(h)=0.25(Gn+Ge+Gs+Gw)$$

Then derive the local peaking function:

$$Hp=Hc-Ha(h).$$

The local peaking function describes the difference between the actual sample value of the estimation site and the local average for that color. Different filtering functions may be used at this stage leading to different cost-performance tradeoffs. That is, more sophisticated filtering functions can be used to calculate the local averages to give better performance at the expense of increased hardware costs and/or processing time. Alternatively, less sophisticated filtering functions can be used, giving lower performance but reducing hardware costs and/or processing time.

An anti-alias control signal A(h) is derived by combination of a J-derived anti-alias control signal Aj(h) and a G-derived anti-alias control signal Ag(h).
For example:

$$Aj(h)=abs((Jnw+Jse)-(Jne+Jsw))$$

$$Ag(h)=abs((Gn+Gs)-(Ge+Gw))$$

$$A(h)=k_1(\max(Aj(h),Ag(h)))$$

where $k_1$ is a constant; e.g., $k_1=0.5$.

The term abs indicates absolute value (magnitude or modulus) and max indicates the greater of the two values Aj(h) and Ag(h). Preferably, calculating the anti-aliasing value A(h) includes additional steps as follows:

Make Ag(h)=0 unless Gn and Gs are both either higher or lower than Ge and Gw; and Make Aj(h)=0 unless Jnw and Jse are both either higher or lower than Jne and Jsw.

Estimate J' according to:

If $Hc>Ja(h)$: $J'(h)=Hp+Ja(h)+A(h)$

If $J'(h)>Hc$, Then $J'(h)=Hc$

Else, if $Hc<Ja(h)$: $J'(h)=Hp+Ja(h)-A(h)$

If $J'(h)<Hc$, Then $J'(h)=Hc$.

In either case, if the calculated value of J'(h) is greater than Hc, then the value Hc is used for J'(h) rather than the actual calculated value of J'(h). In other words, the aliasing component has the effect of pulling the estimated value J'(h) towards the value Hc, but this effect is limited so that the estimated value J'(h) cannot be pulled beyond the value of Hc.

At this point, full-checkerboard sampling of FIG. 4(a) has been established. An estimated value J' or H' has been obtained for each actual value H or J. Translation from checkerboard to complete sampling can be accomplished by the stage one filtering step 20, as follows.

The averages of all possible neighboring checkerboard pairs are computed, as shown in FIG. 6(a) for G, and FIG. 6(b) for H and H'. By symmetry, FIG. 6(b) also applies to J and J'. This function is performed by the filter 20 in FIG. 2. This has the effect of shifting the sampling grid. The background grid in FIGS. 6(a) and 6(b) represent the input grid and the foreground grid represents the shifted output grid. The output samples are centered on the gap between the input samples and have values corresponding to the average values of the checkerboard pairs as indicated in the diagrams.

Optionally, the output from stage one processing 12, whether combined with the output from stage two 14 or not, may be sharpened at 26 as follows.

Edge-enhance (sharpen) the output from the computed averages of all possible neighboring checkerboard pairs by filtering over a neighborhood. An example of this might be a difference of Gaussians over the 3×3 neighborhoods of FIG. 6. This would produce the output pixel marked by the heavy square in FIG. 6. Without this step, the result of the computed averages is a slightly blurred reconstructed image with its null at the Nyquist frequency. The sharpening step may be substantially conventional, as readily appreciated by one skilled in the act.

While adequate image quality may be obtained from the first stage processing 12 as described above, higher quality may be achievable by including a second stage processing 14. FIG. 4(b) shows the output of the second stage interpolation step 18, where both H' and J' samples are generated at G sites, and G' samples are generated at J and H Sites. From comparison of FIGS. 4(a) and 4(b), the second stage interpolation 18 provides complementary checkerboard sampling on all three color channels as compared to stage one. That is, stage one results in actual G values for each G site, actual H values and estimated J' values for each H site, and actual J values and estimated H' values for each J site.

Stage two results in estimated G' values for each J or H site and estimated H' and J' values for each G site. All of the output data from second stage interpolation 18 comprises estimated values G', H' and J'. For this reason the expected image quality from the second stage 14 alone is inferior to that from the first stage 12.

Once again, compass direction N (north) is associated with the top of the image. J' and H' samples are estimated for each G site, and G' samples for each H and J site. G' samples are estimated in similar fashion to J' in Stage 1, using Ga in place of Ja.

If $Hc>Ga(h)$: $G'(h)=Hp+Ga(h)+A(h)$

If $G'(h)>Hc$, Then $G'(h)=Hc$

Else, if $Hc<Ga(h)$: $G'(h)=Hp+Ga(h)-A(h)$

If $G'(h)<Hc$, Then $G'(h)=Hc$

Again, in either case, if the calculated value of G'(h) is greater than Hc, then the value Hc is used for G'(h) rather than the actual calculated value of G'(h).

FIG. 5(b) shows a 5×5 pixel neighborhood centered on a G sample Gc at the estimation site. The edge-touching J samples exist to the N and S directions, edge-touching H samples exist to the E and W directions, corner-touching G samples exist to the NW, NE, SE and SW directions, and remote G samples exist to the N, E, S and W directions.

Local averages Ha(g), Ga(g) and Ja(g) are formed by appropriate center-weighted filtering functions. For example:

$$Ha(g)=0.5\ (He+Hw)$$

$$Ja(g)=0.5\ (Jn+Js)$$

$$Ga(g)=0.5\ Gc+0.125\ (Gnw+Gne+Gse+Gsw)$$

Again, form the local peaking function $Gp=Gc-Ga(g)$. Different filtering functions would lead to different cost-performance tradeoffs.

A G-derived anti-alias control signal A(g) is formed. For example:

$$Ag(g)=abs((Gn+Gs+Ge+Gw)-(Gnw+Gne+Gse+Gsw));$$

$A(g)=k_2(Ag(g))$; where $k_2$ is some constant, e.g., 0.25.

Estimate H' and J' according to:

If $Gc>Ha(g)$: $H'(g)=Gp+Ha(g)+A(g)$

If $H'(g)>Gc$, Then $H'(g)=Gc$

Else, if $Gc<Ha(g)$: $H'(g)=Gp+Ha(g)-A(g)$

If $H'(g)<Gc$, Then $H'(g)=Gc$.

Again, in either case, if the calculated value of H'(g) is greater than Gc, then the value Gc is used for H'(g) rather than the actual calculated value of H'(g).

If $Gc>Ja(g)$: $J'(g)=Gp+Ja(g)+A(g)$

If $J'(g)>Gc$, Then $J'(g)=Gc$

Else, if $Gc<Ja(g)$: $J'(g)=Gp+Ja(g)-A(g)$

If $J'(g)<Gc$, Then $J'(g)=Gc$.

Again, in either case, if the calculated value of J'(g) is greater than Gc, then the value Gc is used for J'(g) rather than the actual calculated value of J'(g).

At this point, the complementary full-checkerboard sampling of FIG. 4(b) has been established, with an estimated G' value having been obtained for each H or J site and estimated H' and J' values for each G site. Translation from checkerboard to complete sampling can be accomplished by the stage two filtering step 22 as follows.

Averages of all possible neighboring checkerboard pairs are computed, as shown in FIG. 6(a) but in this case for H' and J', and in FIG. 6(b) but in this case for G'. This function is performed by the filter 22 in FIG. 2.

The output from stage two 14 can be combined with the output from stage one 12 as required. Optionally, the combined output from stage one processing 12 and stage two processing 14 may be sharpened using an edge-enhancement algorithm as described above in relation to the stage one processing.

First and second complementary pixel processing stages 12 and 14 have been described, each comprising an interpolation step 16, 18 and a filtering step 20, 22. The output of each interpolation step 16, 18 is a checkerboard of G, J and H, which may now be referred to as RGB. The second stage checkerboard is sited in complementary fashion to the first stage checkerboard, and has an inferior expected quality due to its reliance on estimated samples. There are four options for proceeding to full RGB population using the results of the first and second stage processes:

1. Stage one only interpolation 16;
2. Stage one only interpolation 16 and filtering 20;
3. Stage one and two interpolation 16 and 18 only and combining results; and
4. Stage one and two interpolation 16 and 18 and filtering 20 and 22 and combining results.

The pair-wise averaging used in stage one in the two filtering steps 20 and 22 avoids obtrusive zipper pattern noise artifacts which are encountered with conventional signal reconstructions from CFA imaging arrays using Bayer patterns of the type disclosed in U.S. Pat. No. 3,971,065. Such noise artifacts manifest as horizontal or vertical runs of alternating pixel values, resulting from the juxtaposition of actual and erroneously-estimated pixel values. It is preferred that the sharpening step 26 is used only when the filtering steps 22 and/or 20 have been used. Otherwise, sharpening would amplify any zipper noise.

Figure 7:
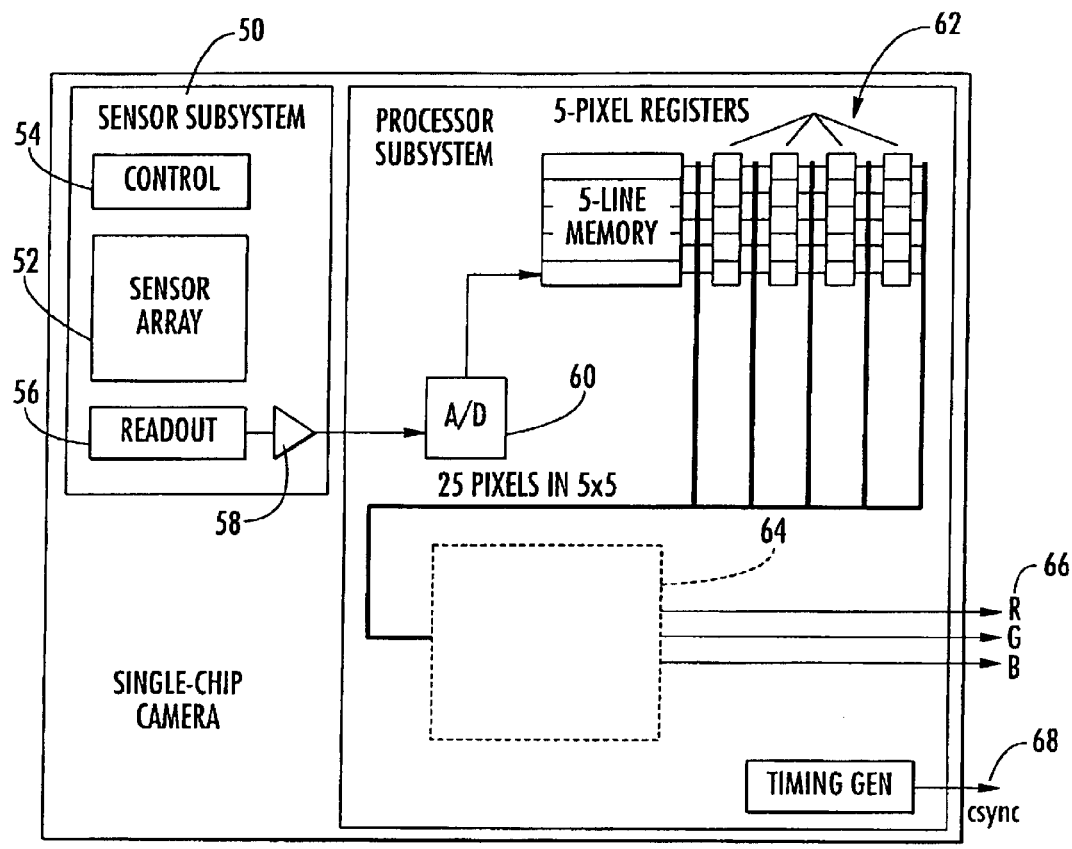
FIG. 7 is a block diagram illustrating a single-chip camera system using the signal processing method in accordance with the present invention.

FIG. 7 shows a typical single-chip camera adapted to implement the method in accordance with the present invention. The camera includes a sensor subsystem 50 comprising a sensor array 52, control and readout circuitry 54 and 56 and output amplification 58. The analog output from the sensor subsystem is converted to a digital signal by an analog-digital (A/D) converter 60. The output from the A/D converter 60 is input to a buffer memory or sampling subsystem 62 which samples the pixel neighborhood upon which the present method operates. In this example, a 5×5 pixel neighborhood corresponds to FIGS. 6(a) and (b).

The output from the buffer memory 62 is input to subsystem 64 which implements the method as illustrated in FIG. 2 and described above. Suitable circuitry for implementing the method will be apparent to those skilled in the art, given the present disclosure, and will not be described in detail herein. The final output from the camera comprises a video signal 66 having three color channels, and a synchronization signal 68.

Figure 8:
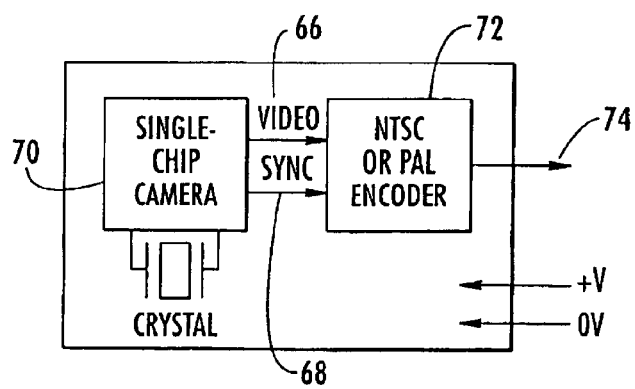
FIG. 8 is a block diagram illustrating an imaging system incorporating the camera of FIG. 7.

FIG. 8 shows an imaging system comprising camera 70 of the type shown in FIG. 7, with the outputs 66 and 68 connected to suitable encoder 72 (e.g., an NTSC or PAL encoder) to produce a final output signal 74 in any required signal format.

It will be understood that the method could be similarly applied in other types of imaging systems employing Bayer-type arrays. The invention thus provides improved signal processing methods for use with Bayer-type imaging arrays and improved imaging systems incorporating those methods. Improvements and modifications may be incorporated without departing from the scope of the invention as defined in the claims appended hereto.

That which is claimed is:

1. A method of processing a video signal from a color imaging array comprising a plurality of luminance elements of a first color, a plurality of chrominance elements of a second color, and a plurality of chrominance elements of a third color, the method comprising:

for each chrominance element of one of the second or third colors having a first chrominance value, estimating a second chrominance value for the other of the second or third colors, the estimated second chrominance values for each individual target element being computed as a function of an actual chrominance value of the target element, a local neighborhood of actual chrominance values of the same color as the estimated second chrominance value, and an anti-aliasing control value derived from a local neighborhood of actual luminance and chrominance values of colors different from that of the target element.

2. A method according to claim 1, wherein estimating the second chrominance values comprise:

deriving local average values for luminance elements and first and second chrominance elements adjacent the target element; and deriving a peaking function from the actual chrominance value of the target element and the derived local average values of chrominance elements having the same color as the target element.

3. A method according to claim 2, wherein the anti-aliasing control value is derived from a combination of a first anti-aliasing control value derived from the values of chrominance elements having a color different from the target element and being adjacent thereto, and a second anti-aliasing control value derived from values of luminance elements adjacent the target element.

4. A method according to claim 3, wherein the estimated second chrominance value is derived from the actual value of the target element, a value of the peaking function, the derived local average value of chrominance elements having the same color as the estimated value, and the anti-aliasing control value.

5. A method according to claim 1, further comprising filtering a sample grid generated as a result of estimating the second chrominance values, the filtering comprising averaging adjacent values of the same color.

6. A method according to claim 1, further comprising:
for each chrominance element, estimating a luminance value as a function of the actual value of the target element, the local neighborhood of actual chrominance values, and the anti-aliasing control value derived from the local neighborhood of actual luminance and chrominance values of color different from that of the target element; and
for each of the luminance elements, estimating further chrominance values for each of the first and second colors, the further estimated chrominance values for each target element being computed as a function of the actual value of the target element, the local neighborhood of actual values having the same color as compared to the estimated value, and a second anti-aliasing control value derived from the local neighborhood of actual luminance values.

7. A method according to claim 6, wherein estimating the luminance value comprises:
deriving local average values for luminance elements and first and second chrominance elements adjacent the target element; and
deriving a peaking function from the actual value of the target element and the derived local average value of chrominance elements having the same color as the target element.

8. A method according to claim 7, wherein the anti-aliasing control value is derived from a combination of a first anti-aliasing control value derived from the values of chrominance elements of a color different from the target element and being adjacent thereto, and a second anti-aliasing control value derived from values of luminance elements adjacent the target element.

9. A method according to claim 8, wherein estimating the luminance value is based upon the actual value of the target element, a value of the peaking function, the local average value of luminance elements, and the anti-aliasing control value.

10. A method according to claim 6, wherein estimating the further chrominance values comprises:
deriving second local average values for the luminance elements and the first and second chrominance elements adjacent the target element; and
deriving a second peaking function from the actual value of the target element and the local average value of luminance elements.

11. A method according to claim 10, wherein the second anti-aliasing control value is derived from values of a further anti-aliasing control value derived from the values of luminance elements adjacent the target element.

12. A method according to claim 11, wherein the estimated further chrominance values are derived from the actual value of the target element, the value of the second peaking function, the second local average values of chrominance elements having the same color as the estimated value, and the second anti-aliasing control value.

13. A method according to claim 6, further comprising a subsequent filtering in which a second sample grid generated by estimating the luminance values and the further chrominance values is filtered by averaging adjacent values of the same color.

14. A method of processing a video signal from a color imaging array comprising a plurality of luminance elements of a first color, a plurality of chrominance elements of a second color and a plurality of chrominance elements of a third color, the method comprising:
for each chrominance element of one of the second or third colors having a first chrominance value, estimating a second chrominance value for the other of the second or third colors;
the estimated second chrominance values for each individual target element being computed as a function of an actual chrominance value of the target element, a local neighborhood of actual chrominance values of the same color as the estimated second chrominance value, and an anti-aliasing control value derived from a local neighborhood of actual luminance and chrominance values of colors different from that of the target element, the estimation of the second chrominance value comprising
deriving local average values for luminance elements and first and second chrominance elements adjacent the target element, and
deriving a peaking function from the actual chrominance value of the target element and the derived local average values of chrominance elements having the same color as the target element; and
filtering a sample grid generated as a result of estimating the second chrominance values, the filtering comprising averaging adjacent values of the same color.

15. A method according to claim 14, wherein the anti-aliasing control value is derived from a combination of a first anti-aliasing control value derived from the values of chrominance elements having a color different from the target element and being adjacent thereto, and a second anti-aliasing control value derived from values of luminance elements adjacent the target element.

16. A method according to claim 15, wherein the estimated second chrominance value is derived from the actual value of the target element, a value of the peaking function, the derived local average value of chrominance elements having the same color as the estimated value, and the anti-aliasing control value.

17. A method according to claim 15, wherein estimating the further chrominance values comprises:
deriving second local average values for the luminance elements and the first and second chrominance elements adjacent the target element; and
deriving a second peaking function from the actual value of the target element and the local average value of luminance elements.

18. A method according to claim 17, wherein a second anti-aliasing control value is derived from values of a further anti-aliasing control value derived from the values of luminance elements adjacent the target element.

19. A method according to claim 18, wherein the estimated further chrominance values are derived from the actual value of the target element, the value of the second peaking function, the second local average values of chrominance elements having the same color as the estimated value, and the second anti-aliasing control value.

20. A method according to claim 14, further comprising:

for each chrominance element, estimating a luminance value as a function of the actual value of the target element, the local neighborhood of actual chrominance values, and the anti-aliasing control value derived from the local neighborhood of actual luminance and chrominance values of color different from that of the target element; and for each of the luminance elements, estimating further chrominance values for each of the first and second colors, the further estimated chrominance values for each target element being computed as a function of the actual value of the target element, the local neighborhood of actual values having the same color as compared to the estimated value, and a second anti-aliasing control value derived from the local neighborhood of actual luminance values.

21. A method according to claim 20, wherein estimating the luminance value comprises:

deriving local average values for luminance elements and first and second chrominance elements adjacent the target element; and deriving a peaking function from the actual value of the target element and the derived local average value of chrominance elements having the same color as the target element.

22. A method according to claim 21, wherein the anti-aliasing control value is derived from a combination of a first anti-aliasing control value derived from the values of chrominance elements of a color different from the target element and being adjacent thereto, and a second anti-aliasing control value derived from values of luminance elements adjacent the target element.

23. A method according to claim 21, wherein estimating the luminance value is based upon the actual value of the target element, a value of the peaking function, the local average value of luminance elements, and the anti-aliasing control value.

24. A method according to claim 14, further comprising a subsequent filtering in which a second sample grid generated by estimating the luminance values and the further chrominance values is filtered by averaging adjacent values of the same color.

25. A method according to claim 14, further comprising applying a sharpening algorithm to a final output signal.

26. A color imaging system comprising:

a color imaging array comprising a plurality of luminance elements of a first color, a plurality of chrominance elements of a second color, and a plurality of chrominance elements of a third color;

a signal processor comprising an interpolator circuit connected to said color imaging array for receiving a video signal output therefrom, said interpolator circuit operating to estimate for each chrominance element of the second color a second chrominance value for the third color, the estimated chrominance values for each individual target element being computed as a function of an actual chrominance value of the target element, a local neighborhood of actual chrominance values of the third color to the estimated second chrominance value, and an anti-aliasing control value derived from the local neighborhood of actual luminance and chrominance values of colors different to that of the target element.

27. A color imaging system according to claim 26, further comprising a filter connected to an output of said interpolator circuit for filtering an output therefrom by averaging adjacent values of the same color.

28. A color imaging system according to claim 26, further comprising:

a second interpolator circuit connected to said color imaging array for receiving the video signal output therefrom, said second interpolator circuit operating to estimate a luminance value for each of the chrominance elements, the estimated luminance value for each individual target element being computed as a function of the actual value of the target element, the local neighborhood of actual chrominance values, and the anti-aliasing control value; and a third interpolator circuit connected to said image sensor for receiving the video signal output therefrom, said third interpolator circuit operating to estimate for each of the luminance elements further chrominance values for each of the second and third colors, the estimated further chrominance values for each individual target element being computed as a function of the actual value of the target element, the local neighborhood of actual values having the same color as the estimated value, and a second anti-aliasing control value derived from the local neighborhood of actual luminance values.

29. A color imaging system according to claim 28, further comprising a second filter and a third filter connected to respective outputs of said second and third interpolator circuits for filtering an output therefrom by averaging adjacent values of the same color.

30. A color imaging system according to claim 28, further comprising:

a combining circuit connected to the outputs of said second and third interpolator circuits; and a sharpening circuit connected to an output of said combining circuit for enhancing the video signal output.

* * * * *